(12) United States Patent
Xi et al.

(10) Patent No.: US 10,753,027 B2
(45) Date of Patent: Aug. 25, 2020

(54) WASHING MACHINE

(71) Applicant: TCL INTELLIGENT TECHNOLOGY (HEFEI) CO. LTD., Hefei, Anhui (CN)

(72) Inventors: Lei Xi, Anhui (CN); Chouguo Zhou, Anhui (CN); Fei Zhao, Anhui (CN); Jian Wang, Anhui (CN); Xiaowei Xie, Anhui (CN)

(73) Assignee: TCL INTELLIGENT TECHNOLOGY (HEFEI) CO. LTD., Hefei, Anhui (CN)

( * ) Notice: Subject to any disclaimer, the term of this patent is extended or adjusted under 35 U.S.C. 154(b) by 395 days.

(21) Appl. No.: 15/820,460

(22) Filed: Nov. 22, 2017

(65) Prior Publication Data
US 2018/0073176 A1 Mar. 15, 2018

Related U.S. Application Data

(63) Continuation of application No. PCT/CN2016/074568, filed on Feb. 25, 2016.

(30) Foreign Application Priority Data

| May 27, 2015 | (CN) | 2015 1 0278484 |
| May 27, 2015 | (CN) | 2015 2 0351102 U |
| Sep. 6, 2015 | (CN) | 2015 2 0683105 U |

(51) Int. Cl.
| D06F 17/06 | (2006.01) |
| D06F 17/10 | (2006.01) |
| D06F 37/24 | (2006.01) |
| F16D 1/06 | (2006.01) |
| F16D 1/08 | (2006.01) |
| F16D 1/108 | (2006.01) |
| F16D 1/10 | (2006.01) |

(52) U.S. Cl.
CPC .............. *D06F 17/10* (2013.01); *D06F 37/24* (2013.01); *F16D 1/06* (2013.01); *F16D 1/0894* (2013.01); *F16D 1/108* (2013.01); *D06F 17/06* (2013.01); *F16D 2001/103* (2013.01)

(58) Field of Classification Search
CPC .......... D06F 17/06; D06F 17/10; D06F 37/24; F16D 1/06; F16D 1/0894; F16D 1/108; F16D 2001/103
USPC ........................... 68/131, 132, 133, 134, 140
See application file for complete search history.

(56) References Cited

U.S. PATENT DOCUMENTS

| 6,202,451 B1 * | 3/2001 | Park | D06F 37/40 |
| | | | 68/133 |
| 2014/0190217 A1 * | 7/2014 | Cole | D06F 21/06 |
| | | | 68/134 |

FOREIGN PATENT DOCUMENTS

| CN | 87203855 | 1/1988 |
| CN | 201136975 | 10/2008 |

(Continued)

*Primary Examiner* — Levon J Shahinian
(74) *Attorney, Agent, or Firm* — Winston Hsu

(57) ABSTRACT

Disclosed is a washing machine. The washing machine comprises an impeller, a decelerating clutch and an impeller connection assembly, wherein the decelerating clutch has a rotary shaft; and the impeller connection assembly is clamped and clamped and fixedly connected to the rotary shaft, so that the impeller is clamped and fixedly connected to the rotary shaft in a detachable way, thereby reducing the difficulties of the assembly and disassembly of the impeller, and prolonging the service life of the washing machine.

16 Claims, 11 Drawing Sheets

(56) References Cited

FOREIGN PATENT DOCUMENTS

| CN | 202227142 | 5/2012 |
|---|---|---|
| CN | 202227153 | 5/2012 |
| CN | 104233696 | 12/2014 |
| CN | 204780307 | 11/2015 |
| CN | 204780312 | 11/2015 |
| CN | 105133238 | 12/2015 |
| CN | 105274765 | 1/2016 |

\* cited by examiner

WASHING MACHINE

CROSS REFERENCE TO RELATED APPLICATIONS

This application is a continuation of International Application No. PCT/CN2016/074568, filed on Feb. 25, 2016.

BACKGROUND OF THE INVENTION

1. Field of the Invention

The present disclosure relates to a field of washing machine, and in particular, to clothes washing machine.

2. Description of the Prior Art

With the progress and development of society, people pay more and more attention to their own quality of life. People gradually realize that after a period of time of using the washing machine, some invisible corners will hide dirt and bacteria, like the bottom surface of the impeller, the bottom of the inner tub, the inner wall of the inner tub and the inner wall of the outer tub, and need to be cleaned from time to time. However, in the prior art, the impeller and the rotary shaft are usually fixed by screws, due to screws are inconvenient to install or disassemble and easy to be damaged during the process of disassembling, the service life of the washing machine is likely to be impaired.

The foregoing is just for the purpose of easy understanding of the technical solution of the present disclosure and does not recognize that the foregoing is prior art.

SUMMARY OF THE INVENTION

The main object of the present disclosure is to provide a washing machine that mitigates the difficulty of disassembling the impeller and prolonging the service life of the washing machine.

In order to achieve the above mentioned object, the present disclosure provides a washing machine, which includes an impeller, a decelerating clutch and an impeller connection assembly, the decelerating clutch includes a rotary shaft; and the impeller connection assembly is clamped and connected to the rotary shaft, so that the impeller is clamped and fixedly connected to the rotary shaft in a detachable way.

Preferably, the impeller connection assembly includes a spline and a latch piece, the impeller is coupled with the rotary shaft by the spline, the latch piece is clamped and fixedly engaged with the rotary shaft and engaged with the impeller, to limit the movement of the impeller in an axial direction of the rotary shaft.

Preferably, the latch piece includes a latch case, a latch body, a latch pressed spring and a clamp retainer ring; the latch case is provided with a through hole for accommodating the latch body, the protrusion portion of the bottom end of the through hole is provided with a restraining step; the latch body is movable in an axial direction of the through hole, the bottom end of the latch body is recessed inwardly to form a receiving chamber for accommodating the rotary shaft; the top end of the latch pressed spring is in contact with the latch body and the bottom end is in contact with the restraining step; the clamp retainer ring is detachably fixed to the outer wall of the latch body, and is located below the restraining step to connect to the restraining step; the outer wall of the latch body is provided with a restraining hole configured to go through the receiving chamber in the corresponding position of the restraining step, on the inside of the restraining hole is provided with a restraining protrusion, and the restraining protrusion is clamped and engaged within a restraining groove preset on the rotary shaft.

Preferably, the outer wall of the latch body is provided with a latching groove fitted with the clamp retainer ring; the clamp retainer ring is located within the latching groove, clamped and connected to the latch body.

Preferably, the restraining hole is a tapered hole, and the inner diameter of the end of the tapered hole that communicates with the receiving chamber is smaller than the inner diameter of the other end; the restraining protrusion is a sphere.

Preferably, the impeller connection assembly also includes a protective cover and a cover pressed spring, the protective cover is provided with a receiving hole for receiving the latch piece; the bottom surface of the protective cover is provided with several snaps, the snaps are clamped with an engaging hole preset on the impeller; one end of the cover pressed spring is in contact with the bottom surface of the protective cover, the other end is in contact with the impeller.

Preferably, the impeller is provided with a first groove for receiving the cover pressed spring, one end of the cover pressed spring that in contact with the impeller is located in the first groove.

Preferably, the bottom surface of the protective cover is further provided with a reinforcing rib, which is fitted with a guide hole preset in the impeller to guide the protective cover to move in the axial direction of the receiving hole.

Preferably, the impeller connection assembly includes a spline and a latch piece, the impeller is coupled with the rotary shaft by the spline; the latch piece is clamped and fixedly engaged within the rotary shaft, and fixedly connected with the impeller, to limit axial movement of the impeller in the rotary shaft.

Preferably, the latch piece includes an impeller latch case, an impeller latch cover and a latch core; the impeller latch case is clamped and fixedly connected to the impeller, the impeller latch cover is clamped and fixedly connected to the impeller latch case, the latch core is clamped and connected to the impeller latch cover; the impeller latch cover includes a receiving chamber, one end of the rotary shaft passes through the impeller and the impeller latch case so as to be located within the receiving chamber and is clamped and fixedly engaged within the latch core.

Preferably, the latch core includes a handle portion, two elastic snaps and two clamping arms, the snaps and clamping arms are extending from the same side of the handle portion, the two elastic snaps are located outside the two clamping arms; the impeller latch cover sets an insertion hole and two fixing holes, the insertion hole is configured for the latch core to insert into the receiving chamber, the fixing holes are located on both sides of the insertion hole and are fitted with two elastic snaps; the rotary shaft is provided with a third groove in ring shape; two clamping arms located in the third groove are configured to clamp and fix to the rotary shaft.

Preferably, the impeller connection assembly is an impeller latch, configured for fixing the impeller on the rotary shaft, the impeller latch includes a snap portion, the rotary shaft is provided with a snap-fit portion that is fitted with the snap portion, the snap portion is movable in a direction away from the snap-fit portion by an external force to release the engagement with the snap-fit portion.

Preferably, the impeller latch is provided with a mounting groove, the mounting groove is extending into the mounting groove, the mounting groove having an inner wall surface, the snap portion extends to the inner wall surface and extends into the mounting groove.

Preferably, the impeller latch includes a hollow cylindrical lock body, the hollow portion of the lock body forms a mounting groove, the lock body having an outer portion penetrating through the lock body in the radial direction and a channel of the mounting groove, the snap portion is received in the channel.

Preferably, the impeller latch further includes a lock member sleeved on the lock body, the lock member is provided with a protrusion portion corresponding to the position of the channel; the snap portion is a sphere inside the channel. The snap-fit portion is a second groove provided on the rotary shaft, and the protrusion portion abuts the ball so that the ball is held in the second groove.

Preferably, the top end of the lock body includes a sealing portion, the impeller latch further includes an elastic member and an axial restraining member that are sleeved on the lock body and positioned between the lock body and the lock member, the elastic member is held between the sealing portion of the lock body and the protrusion portion of the lock member, the axial restraining member is located below the protrusion portion.

Preferably, the channel is in a round shape, the aperture of the channel of which is close to the mounting groove is smaller than that far from the mounting groove.

Preferably, the rotary shaft is provided with a first spline 23 in the axial direction of the upper portion, the impeller includes a mounting through hole for the upper portion of the rotary shaft, and the inner wall of the mounting through hole is provided with a second spline that is fitted with the first spline.

Preferably, the impeller latch is relatively fixed to the impeller.

Preferably, the impeller is made up from material of stainless steel.

Embodiments of the present disclosure achieve the detachably fixed connection between the impeller and the rotary shaft by setting the impeller connection assembly, clamped and connected to the rotary shaft. Relative to a conventional connection that is fixed by screws, the present disclosure may effectively mitigate the difficulty of disassembling the impeller, thereby reducing the damage to the parts during the disassembly of the washing machine and prolonging the service life of the washing machine.

These and other objectives of the present invention will no doubt become obvious to those of ordinary skill in the art after reading the following detailed description of the preferred embodiment that is illustrated in the various figures and drawings.

The achievement of the object, functional features and advantages of the present disclosure will be further described with reference to the embodiments and accompanying drawings.

DETAILED DESCRIPTION

It is to be understood that, all the specific embodiments described herein serve only for illustrative purpose, and are not a limitation of the disclosure.

Figure 1:
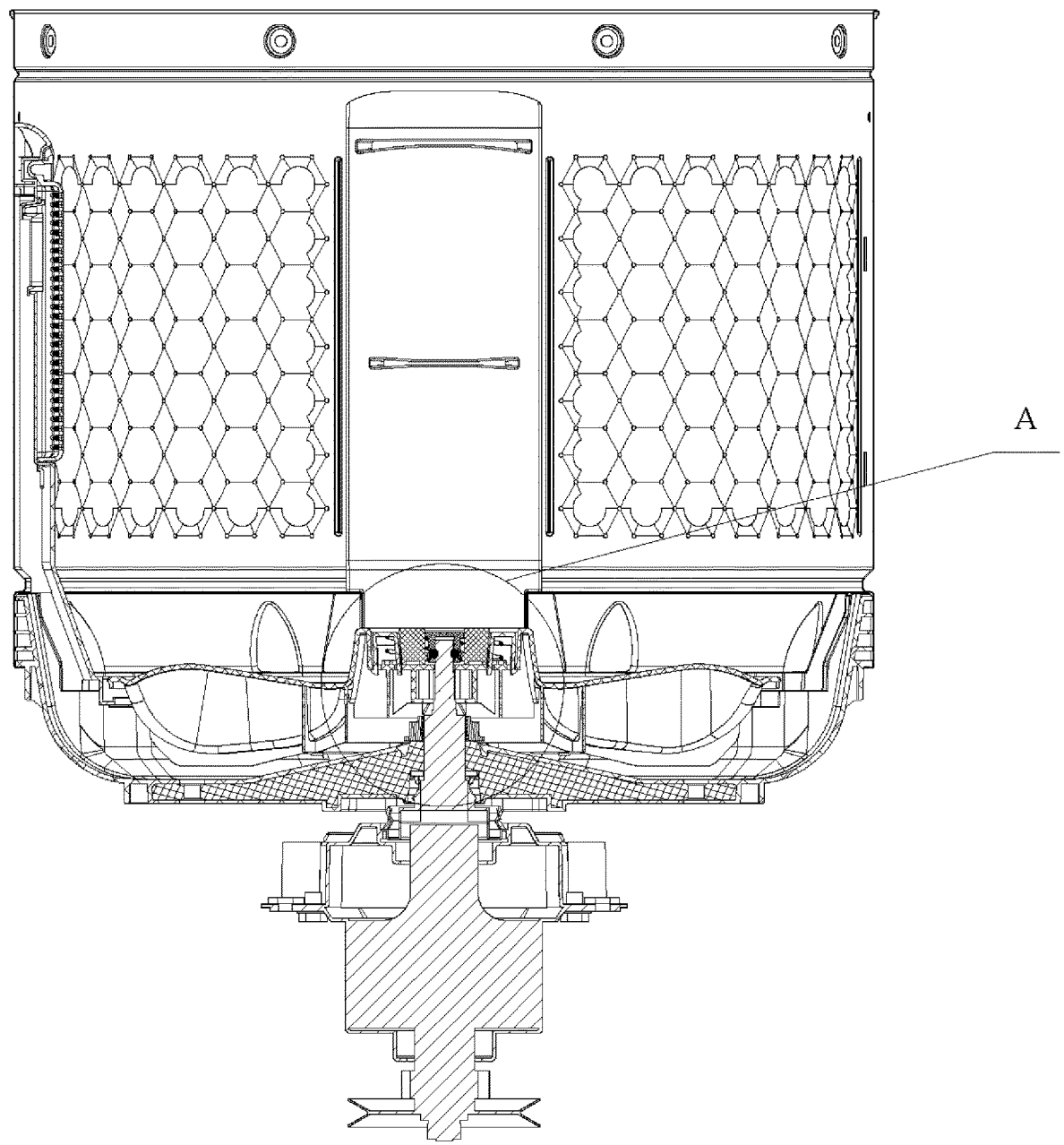
FIG. 1 is a cross-sectional view of a washing machine according to an embodiment of the present disclosure.
Figure 2:
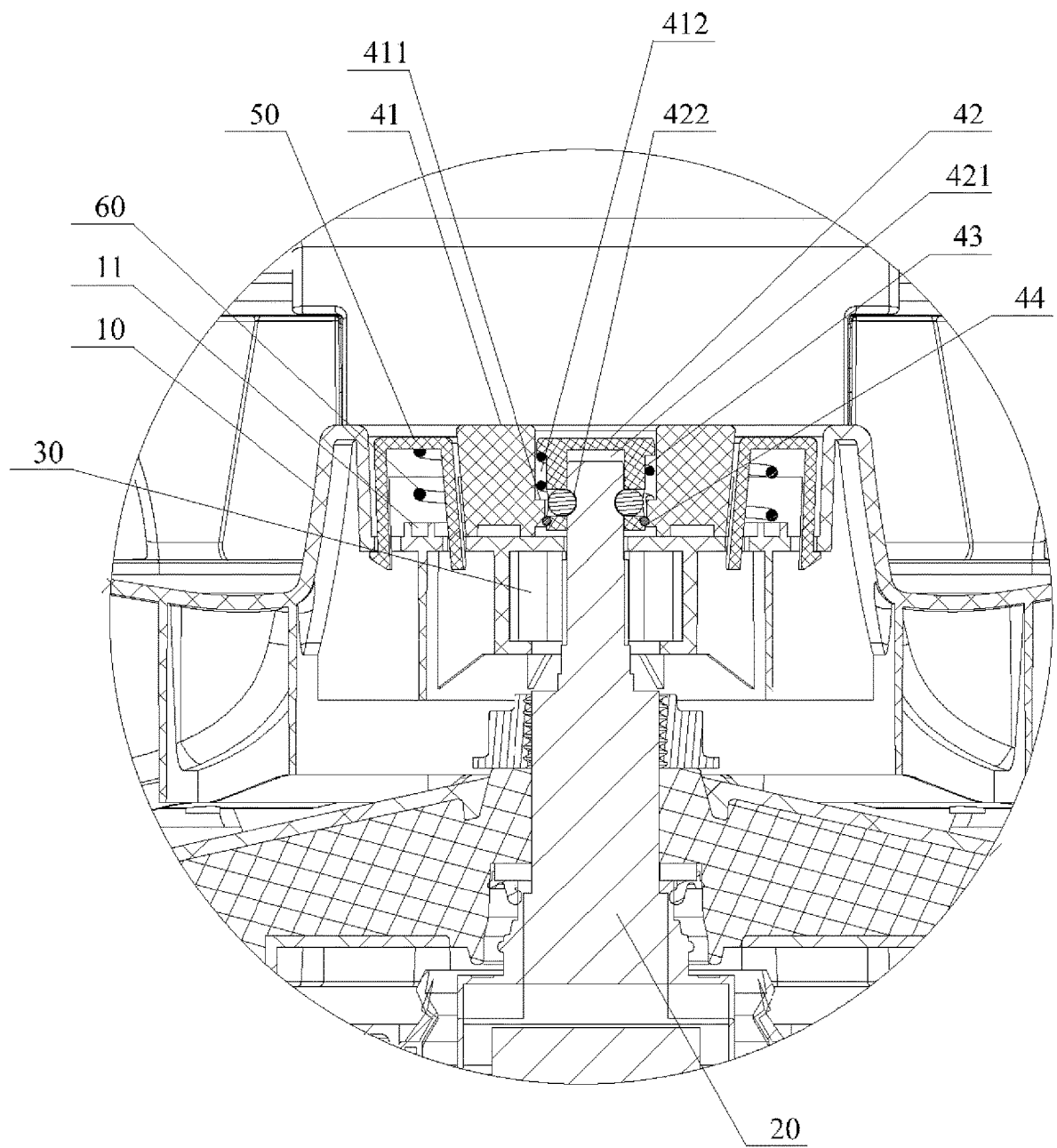
FIG. 2 shows an enlargement view of a position A in FIG. 1 according to an embodiment of the present disclosure.
Figure 3:
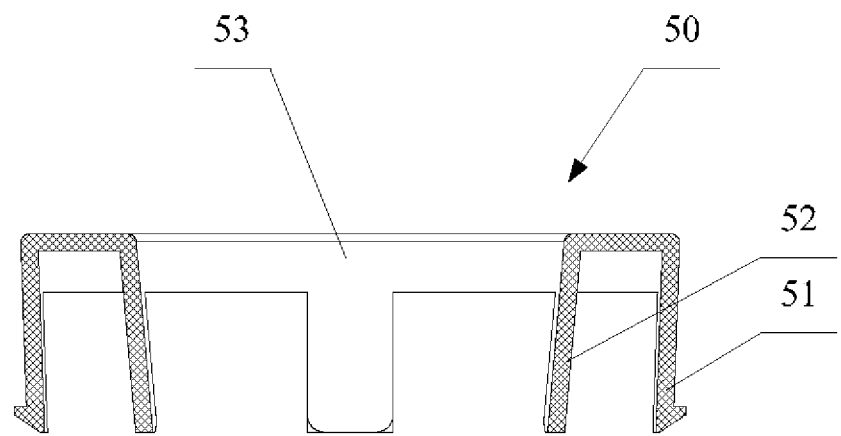
FIG. 3 illustrates the protective cover in FIG. 2.
Figure 4:
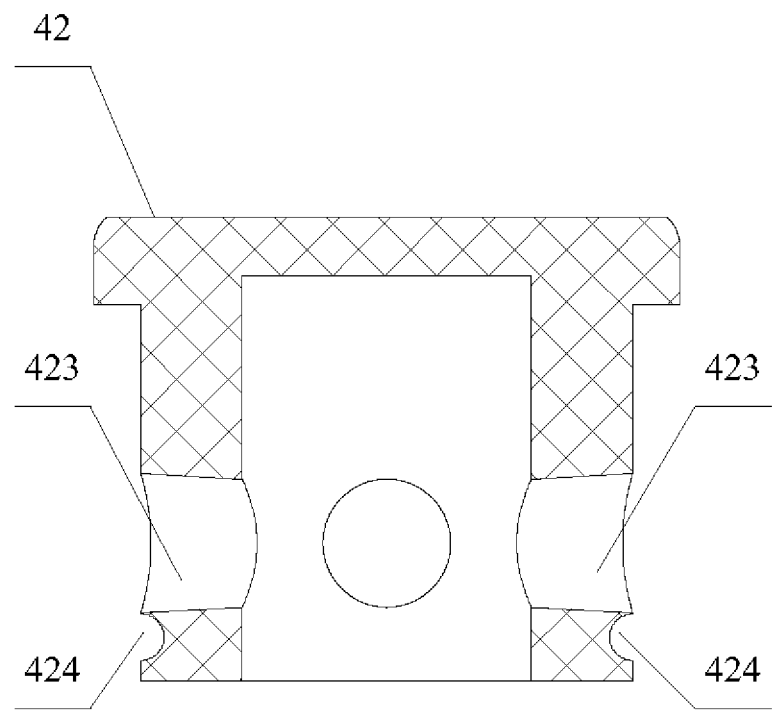
FIG. 4 illustrates the cylinder body in FIG. 2.
Figure 5:
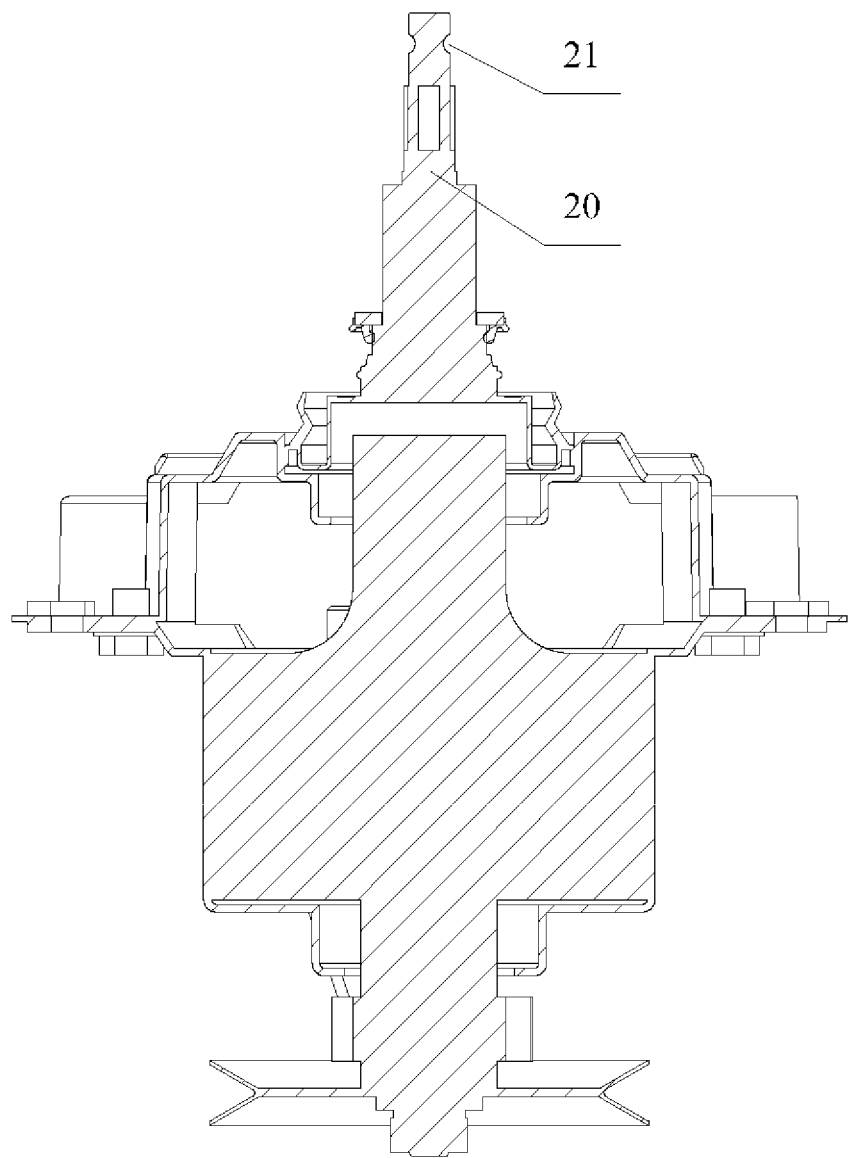
FIG. 5 illustrates the rotary shaft in FIG. 2.
Figure 6:
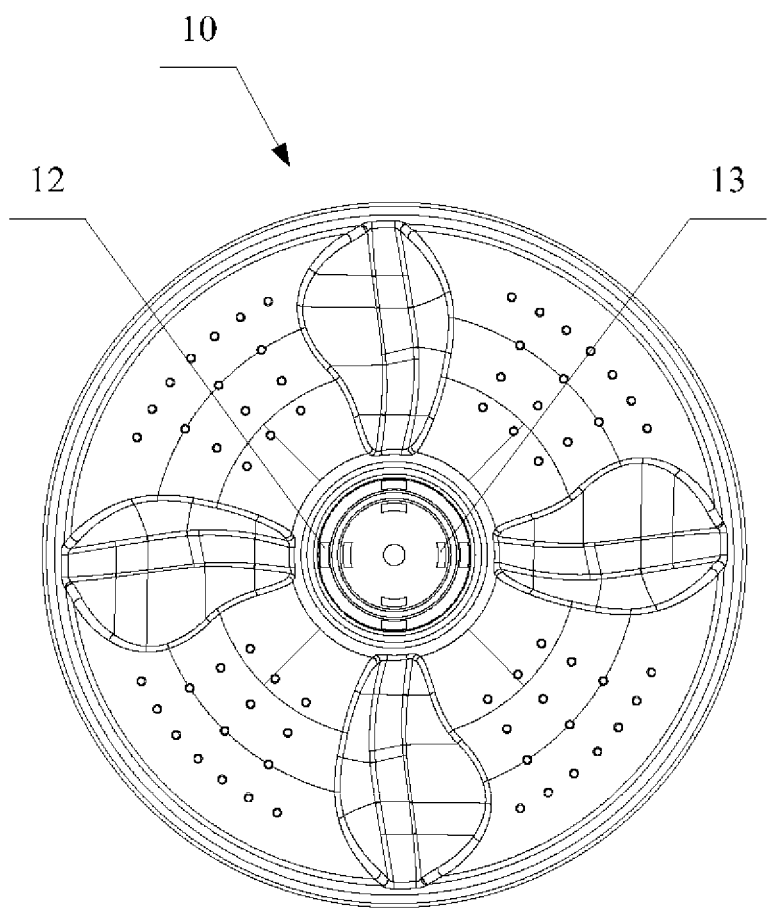
FIG. 6 illustrates the impeller in FIG. 1.
Figure 7:
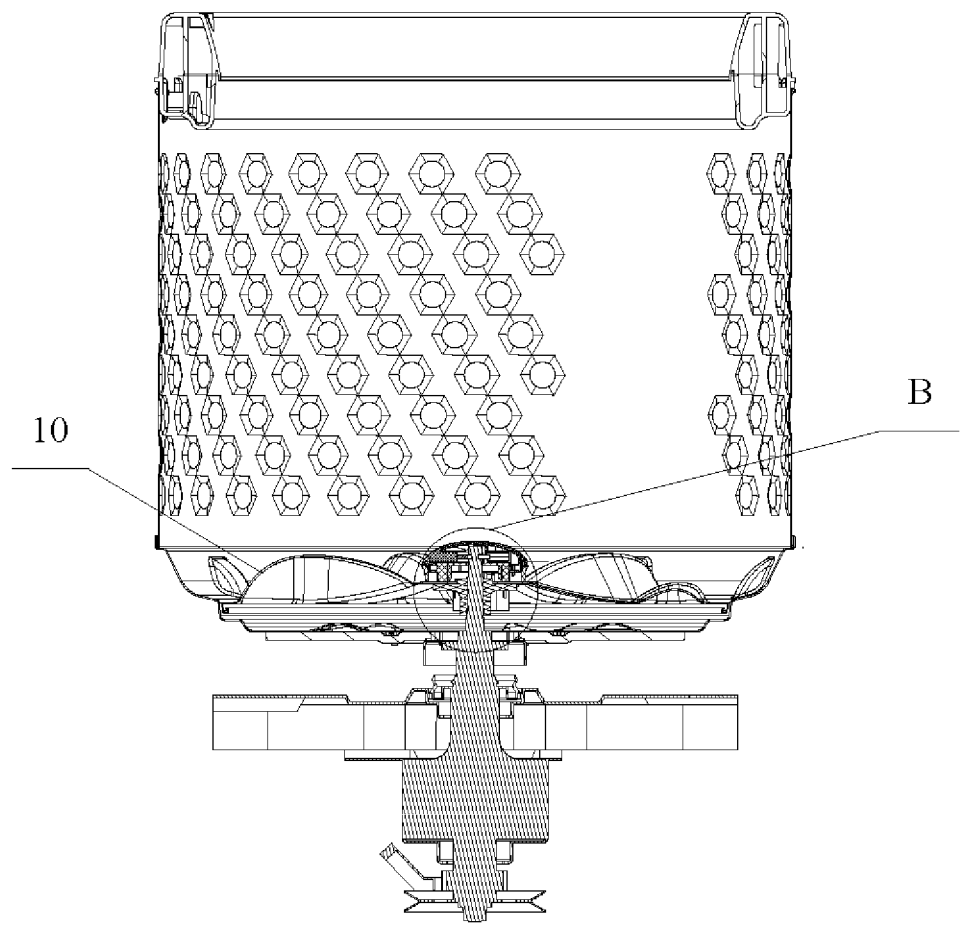
FIG. 7 is a cross-sectional view of the washing machine according to another embodiment of the present disclosure.
Figure 8:
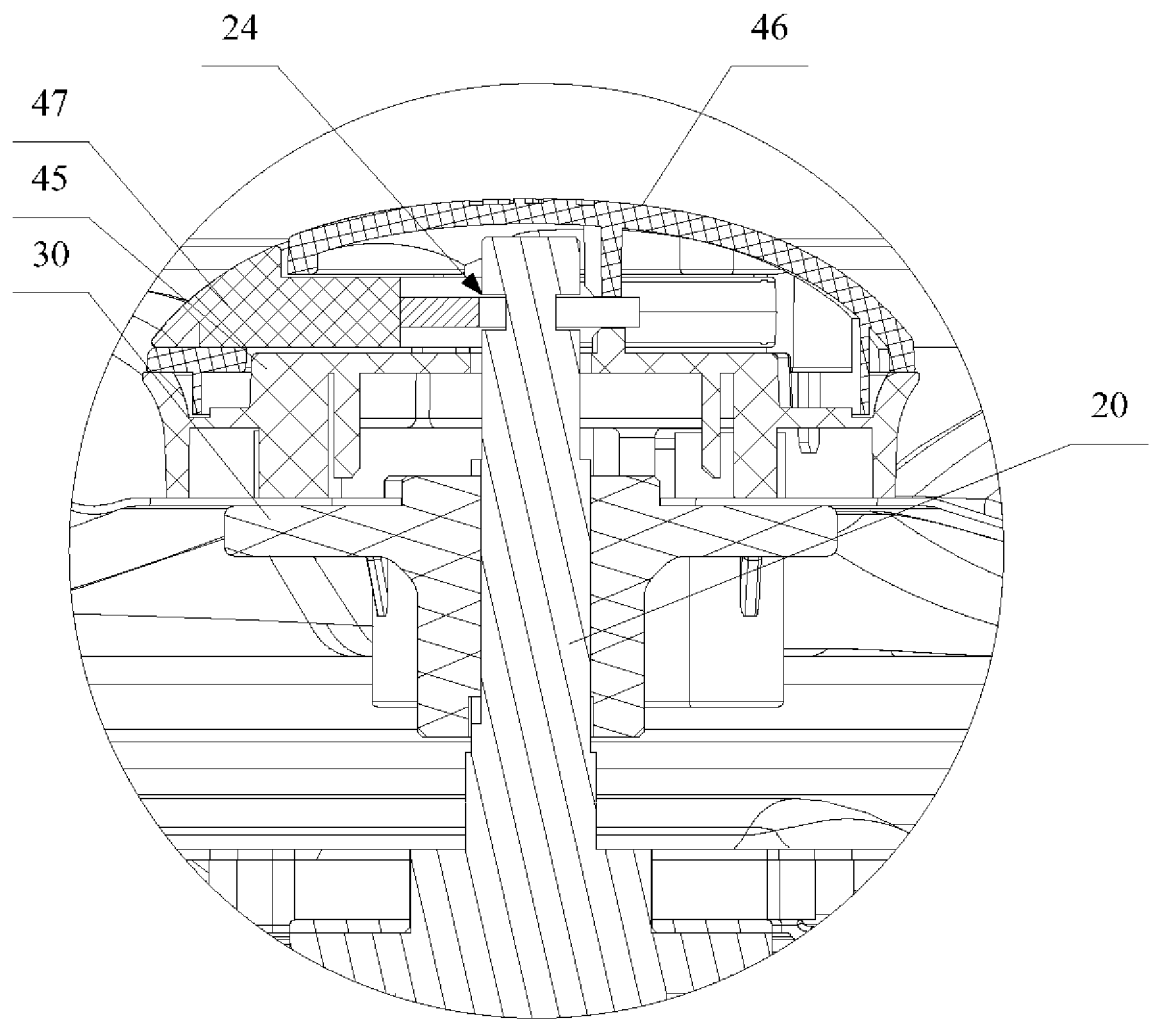
FIG. 8 shows an enlargement view of a position B in FIG. 7 according to an embodiment of the present disclosure.
Figure 9:
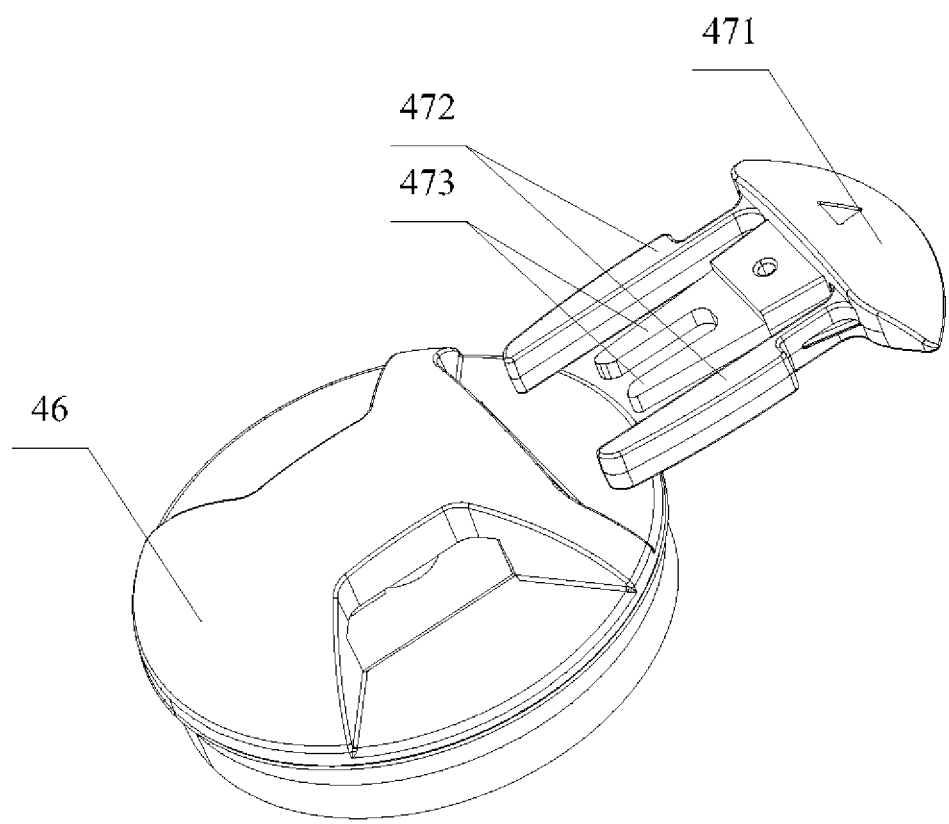
FIG. 9 is an exploded view of the impeller latch cover assembled with the latch core.
Figure 10:
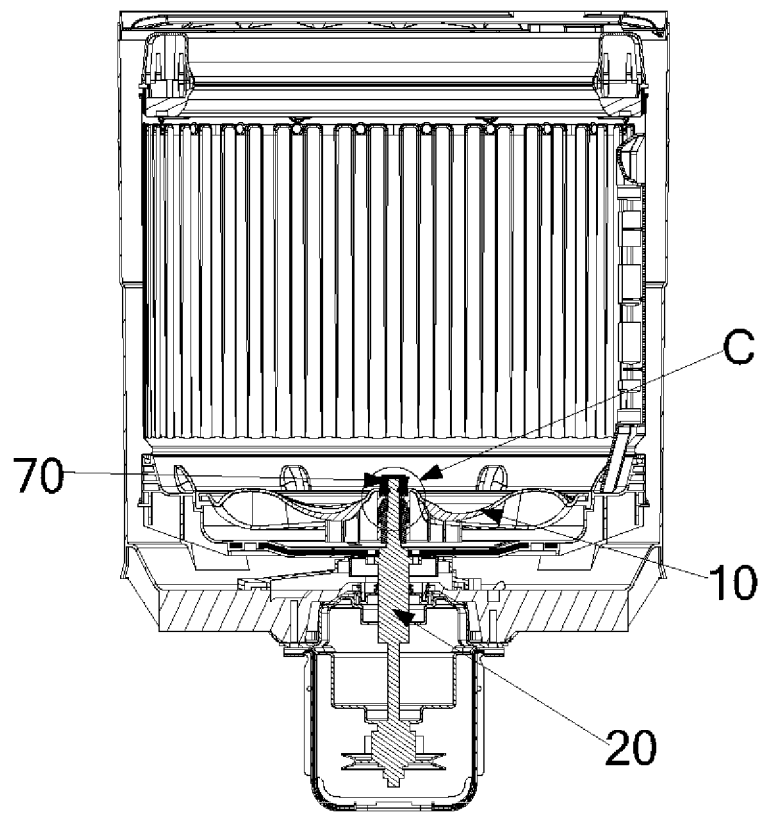
FIG. 10 is across-sectional view of a washing machine according to another embodiment of the present disclosure.
Figure 11:
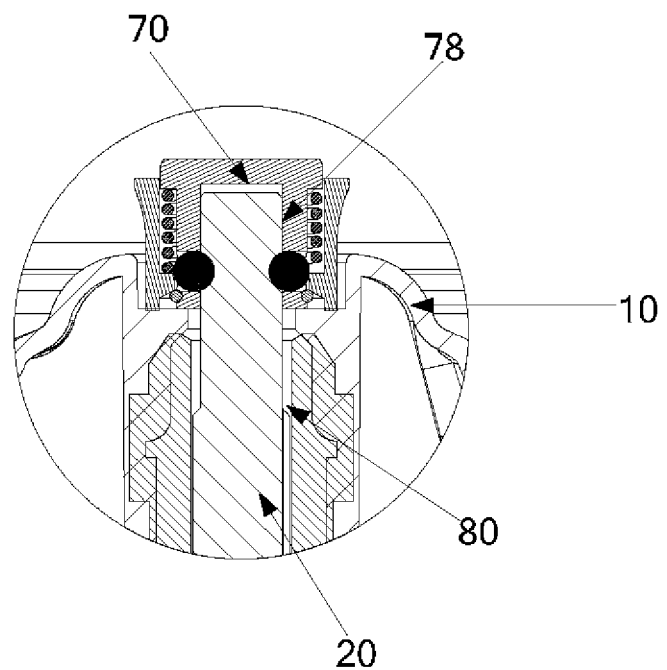
FIG. 11 is a partial enlargement view of a position C in FIG. 10 according to an embodiment of the present disclosure.

The technical solution of the present disclosure may lock the impeller 10 in the axial direction of the rotary shaft 20 by using cylinders in different structures. Referring to FIGS. 7 to 9, in a preferred embodiment of the present disclosure, the impeller connection assembly includes a spline 30 and a latch piece, the impeller 10 is coupled with the rotary shaft 20 by the spline, the latch piece is clamped and fixedly engaged within the rotary shaft 20, and clamped and fixedly connected to the impeller 10, to limit the axial movement of the impeller 10 in the rotary shaft 20.

In particular, in the present embodiment, the latch piece includes an impeller latch case 45, an impeller latch cover 46 and a latch core 47, the impeller latch case 45 is clamped and fixedly connected to the impeller 10, the impeller latch cover 46 is fixedly engaged within the impeller latch case 45, the latch core 47 is fixedly engaged within the impeller latch cover 46, the impeller latch cover 46 includes a receiving chamber, one end of the rotary shaft 20 is located within the receiving chamber passing through the impeller 10 and the impeller latch case 45, and is clamped and fixed with the latch core 47.

The latch core 47 includes a handle portion 471, two elastic snaps 472 and two clamping arm 473, the snaps and clamping arms are extending from the same side of handle portion 471, the two elastic snaps 472 are located outside the two clamping arms 473; the impeller latch cover 46 sets an insertion hole configured for the latch core to insert into the receiving chamber and fixing holes that are located on both sides of the insertion hole and fixed with the two elastic snaps 472; the rotary shaft 20 is provided with a third groove 24 arranged in a ring shape, two clamping arms located in the third groove 24 are configured to clamp and fix to the rotary shaft 20.

In the present embodiment, the impeller latch cover 46 is provided with a claw and a positioning pin toward one side of the impeller latch case 45; the impeller latch case 45 is provided with a square hole at a position corresponding to the claw, the position corresponding to the positioning pin includes a positioning hole. When installation, firstly the impeller latch cover 46 may be integrally formed by the cooperation of the claw and the positioning pin, and then the whole is fixed to the impeller 10 by means of screw fixing. Finally insert the latch core 47 into the receiving chamber through the insertion hole, and held by the two clamping arms into the second groove 24 until the two elastic snaps 472 are clamped and fixedly engaged within the corresponding fixing holes, to limit the impeller of moving in the axial direction of the rotary shaft 20.

The present disclosure provides a washing machine, with reference to FIGS. 1 to 6, in other one embodiment, the washing machine includes an impeller 10, a decelerating clutch and an impeller connection assembly, the decelerating clutch having a rotary shaft 20, the impeller connection assembly is clamped and fixedly engaged within the rotary shaft 20, so the impeller 10 is clamped and fixedly connected to the rotary shaft 20 in a detachable way.

The embodiment of the present disclosure achieves the fixed connection between the impeller 10 and the rotary shaft 20 in a detachable way by setting the impeller connection assembly and which is clamped and connected to the rotary shaft 20. Therefore, relative to the conventional method that is fixed by screws, the present disclosure may effectively mitigate the difficulty of disassembling the impeller, thereby reducing the damage to the parts during the disassembly of the washing machine and prolonging the service life of the washing machine.

It is to be understood that the structure of the impeller connection assembly may be set according to practical needs. For example, in an embodiment, the impeller connection assembly is clamped and fixedly connected to the rotary shaft 20 in a detachable way, the impeller connection assembly includes a spline 30 and a latch piece, the impeller 10 is coupled to the rotary shaft 20 by the spline 30, the latch piece is clamped and fixedly connected to the rotary shaft 20 in a detachable way, and in contact with the impeller 10 to limit axial movement of the impeller 10 in the rotary shaft 20.

The above impeller connection assembly is mainly applied to a washing machine with impeller, to achieve the fixing of the impeller 10 and the rotary shaft 20. In the present embodiment, the rotary shaft 20 is a decelerating clutch rotary shaft for controlling the rotation of the impeller 10. In particular, there may be provided a receiving space at the center of the upper surface of the impeller 10 for mounting and receiving the latch piece, and between the side wall of the receiving space and the outer wall of the latch piece there have a gap for the user to carry out disassembly.

The present disclosure restrains the relative rotation between the impeller 10 and the rotary shaft 20, by means of connecting the impeller 10 with the rotary shaft 20 by using the spline 30, at the same time fixedly engaged with the rotary shaft 20 by means of latch piece to restrict the impeller 10 from moving in the axial direction in the rotary shaft 20; due to the method to fixed the impeller 10 by snaps, relative to the prior art that fixed by screws, the disclosure may effectively mitigate the difficulty of disassembling the impeller, thereby reducing the damage to the parts during the disassembly of the washing machine and prolonging the service life of the washing machine.

It is to be understood that the structure of the above-mentioned latch piece may be provided in accordance with the practical needs. In the present embodiment, it is preferable that the above latch piece includes a latch case 41, a latch body 42, a latch pressed spring 43 and a clamp retainer ring 44; the latch case 41 is provided with a through hole 412 for accommodating the latch body 42, the protrusion portion of the bottom end of the through hole 412 is provided with a restraining step 411; the latch body 42 is movable in an axial direction of the through hole 412, and the bottom end of the latch body 42 is recessed inwardly to form a receiving chamber 421 for accommodating the rotary shaft 20; the top end of the latch pressed spring 43 is in contact with the latch body 42, and the bottom end is in contact with the restraining step 411; the clamp retainer ring 44 is detachably fixed to the outer wall of the latch body 42 and is located below the restraining step 411 to connect to the restraining step 411, to limit the distance of the latch body 42 to move in the axial direction of the through hole 412 in the through hole 412; the outer wall of the latch body 42 is provided with a restraining hole 423 configured to go through the receiving chamber 421 in the corresponding position of the restraining step 411, on the inside of the restraining hole 423 is provided with a restraining protrusion 422, the restraining protrusion 422 is clamped and engaged within a restraining groove 21 preset on the rotary shaft 20.

Specifically, the outer wall of the latch body 42 is provided with a latching groove 424 fitted with the clamp retainer ring 44; the clamp retainer ring 44 is located within the latching groove 424, clamped and connected to the latch body 42. The shape of the restraining step 411 may be set according to practical needs. Preferably, the restraining step 411 is an annular step. Specifically, the inner diameter of the annular step is smaller than the outer diameter of the clamp retainer ring 44, so that when the latch body 42 moves upwardly by the force of the latch pressed spring 43, the clamp retainer ring 44 is in contact with the restraining step 411, to limit the latch body of continuing to move upward. It is to be understood that the structure in which the latch body 42 for abutting against the latch pressed spring 43 may be provided in accordance with the practical needs; in the present embodiment, it may preferably extend outwardly from the outer wall of the top end of the latch body 42 to form an annular step to abut.

Further, the structure of the restraining hole 423 and the restraining protrusion 422 may be arranged according to practical needs. In the present embodiment, it is preferable that the restraining hole 423 is a tapered hole, and the end of the tapered hole that communicating with the receiving chamber 421 is smaller than the inner diameter of the other end; the restraining protrusion 422 is a sphere. Specifically, the number and the position of the restraining protrusion 422 may be set according to practical needs. Preferably, in order to ensure the balance stability, it needs at least four of the restraining protrusion 422, and set them on the same circle of latch bodies 42 uniformly. The restraining groove 21 is preferably an annular groove for easy installation.

When installation, the impeller 10 is first coupled to the rotary shaft 20 by a spline 30; then fits the restraining protrusions 422 into the corresponding restraining holes 423 respectively, after sleeves the latch pressed spring 43 over the outer ring of the latch body 42, inserts it into the through hole 412 of the latch case 41, so that the latch pressed spring 43 may abut against the restraining step 411 of the latch case 41; continuing apply a downward force and lead the deformation of spring, so that the bottom of the latch body 42 may pierce through the through hole 412, then the clamp retainer ring 44 is attached to the latching groove 424 of the latch body 42 to form the latch piece.

And then the latch piece is placed on the impeller 10, to lead the receiving chamber 421 of the latch body 42 to receive the rotary shaft 20 partially; then apply an external force to depress the latch body 42, leads the latch body 42 to move relatively in the retracting direction of the latch pressed spring 43, and the restraining step 411 is dislocated with the restraining protrusion 422, meanwhile the restraining protrusion 422 moves toward the gap between the latch body and the latch case 41, to provide the rotary shaft 20 with an escape position. When the restraining protrusion 422 is facing the restraining groove 21 on the rotary shaft 20, the restraining protrusion 422 slides into the restraining groove 21, when the external force is removed, the latch piece is restored to the natural state; and the other end will abut against the restraining step 411 so as to effect engagement of the latch piece with the rotary shaft 20; by the force of the latch pressed spring 43, the latch case 41 will abut deeply against the impeller 10, to limit the axial movement of the impeller in the rotary shaft 20.

When disassembly, the latch case 41 only needs to be lift upwardly to dislocate the restraining step 411 and the restraining protrusion 422, and create an escape position for the restraining step 411, and then lift up the latch piece upwardly.

Further, according to the above-described embodiment, in the present embodiment, the impeller connection assembly also includes a protective cover 50 and a cover pressed spring 60, the protective cover 50 is provided with a receiving hole 53 for receiving the latch piece; the bottom surface of the protective cover 50 is provided with several snaps 51, the snaps 51 are clamped with an engaging holes 12 preset on the impeller; one end of the cover pressed spring 60 is in contact with the bottom surface of the protective cover 50, the other end is in contact with the impeller 10.

In the present embodiment, for the easy installation of the cover pressed spring 60, the impeller 10 is provided with a first groove 11 for receiving the cover pressed spring 60, and one end of the cover pressed spring 60 that is in contact with the impeller 10 is located in the first groove 11. Further, the bottom surface of the protective cover is provided with a reinforcing rib 52, which is fitted with a guide hole 13 preset in the impeller 10 to guide the protective cover 50 to move in the axial direction of the receiving hole 53.

Specifically, when installation, firstly places the cover pressed spring 60 in the first groove 11, and apply a downward force to protective cover 50, so the snap 51 may pass through the engaging hole 12, meanwhile the reinforcing rib 52 passes through the guide hole 13, when the pressure is released, the protective cover 50 is fixed by the engagement of the cover pressed spring 60 and the snap 51. At this time, the upper surface of the protective cover 50 is aligned to the upper surface of the latch case 41. When installation and disassembly the latch case 41, apply an upper and lower pressures of the protective cover 50 may release the operational space for the fingers; preferably, the reinforcing rib 52 and the receiving hole 53 provide the receiving space with inverted island structure, and when the protective cover 50 is raised to the uppermost position (i.e., the upper surface of the protective cover 50 is flush with the upper surface of the latch case 411, the receiving space provided by the reinforcing rib 52 and the receiving hole 53 is fitted with the inverted island structure of the latch case 41, to restrict the detachment of the protective cover 50.

It is to be understood that the amount of the snaps 51 and the reinforcing rib 52 may be set according to practical needs. In the present embodiment, in order to ensure the stability of the protective cover, it is preferable that both the snaps 51 and the reinforcing ribs 52 are four, and the four snaps 51 are evenly distributed on the same circumference of the protective cover 50 near the outer side, and the four reinforcing ribs 52 are evenly distributed on the same circumference near the inside of the protective cover 50.

Referring to FIGS. 10 to 14, in another embodiment, the impeller connection assembly may use other structures, which will be described in detail below.

Preferably, in the present embodiment, the impeller connection assembly is impeller latch. In the present embodiment, the washing machine includes an impeller latch 70, an impeller 10, and a decelerating clutch; the center of the decelerating clutch includes a vertically arranged rotary shaft 20, the impeller 10 is installed on the upper portion of the rotary shaft 20, and the impeller 10 includes a mounting through hole 80, the top end of rotary shaft 20 is extended from the mounting through hole 80, the impeller latch 70 is provided with a mounting groove 78 and a snap portion 73, the snap portion 73 protrudes into the mounting groove 78 by passing through the inner wall of the mounting groove 78, the rotary shaft 20 sets snap-fit portion 22 that engage with the snap portion 73, the snap portion 73 engages with the snap-fit portion 22 to fasten the impeller 10 onto the rotary shaft 20. In the present embodiment, the snap-fit portion 22 is preferably an annular second groove.

The washing machine of the present disclosure fastens the impeller 10 to the top end of the decelerating clutch by the impeller latch 70; the quick installation and disassembly of the impeller 10 may be achieved by means of a simple hand operation without means of other external tool, to easier the disassembly and installation of the impeller 10, and damages caused during the disassembly and installation is small, which is good for the cleaning of those parts such as impeller.

Figure 12:
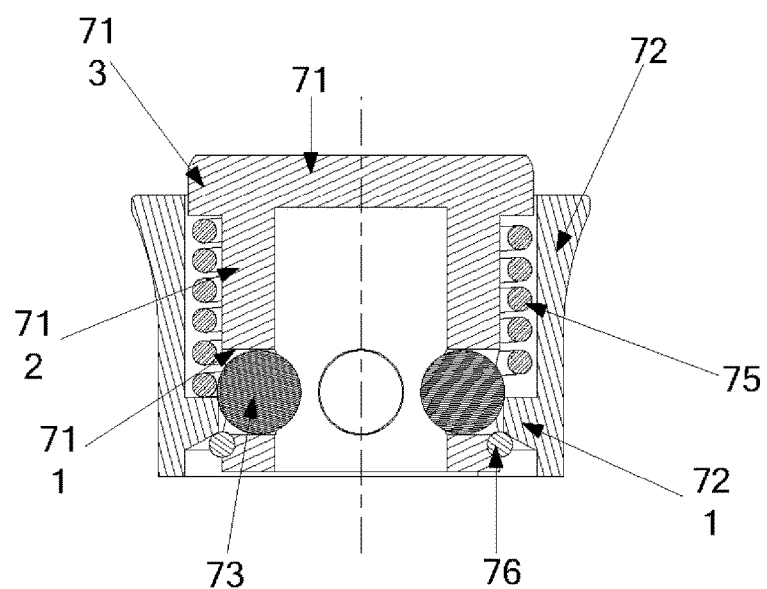
FIG. 12 is a cross-sectional view of the impeller latch in FIG. 11.

In the present embodiment, the specific structure of the impeller latch 70, which is showed as FIG. 12, is: a hollow cylindrical lock body 71, a lock member 72, an elastic member 75, an axial restraining member 76 and a snap portion 73, the hollow portion of the lock body 71 forms a mounting groove 78, the snap portion 73 is preferably four steel balls which are rigid and difficult to wear; the elastic member 75 is preferably a compression spring, in other embodiments may also select another elastic member with good resilience; the axial restraining member 75 is preferably a clamp retainer; the compression spring 75 and the lock member 72 are all hollow cylinder, the lock body 71 includes a hollow cylinder body 712 and a cylindrical sealing portion 713 formed on the top of the body 712, the radius of the sealing portion 713 is larger than the outer radius of the body 712; the lock member 72 is fitted to the outside of the lock body 71 by means of the clamp retainer 76, extending inwardly from the inside of the bottom end of the lock body 71, the lock member 72 is provided with a protrusion portion 721, and the clamp retainer 76 is engaged with the bottom of the protrusion portion 721; the compression spring 75 is disposed between the lock body 71 and the lock member 72 and is fitted over the lock body 71; the sealing portion 713 is located in the lock member 72 and is press-fitted to the top of the compression spring 75; in the lower end of the lock body 71, the circumference includes four rounded-shaped channels 711 that extending radically through the exterior of the lock body 71 and the channel of the mounting groove 78, and the diameter of the hole that close to the mounting groove 78 is smaller than the one far from the mounting groove, the four rounded-shaped channels 711 are evenly distributed on the circumference of the lock body 71, and the four steel balls 73 are respectively disposed within the four rounded-shaped channels 711 and are movable therein; inside the bottom ends of the lock member 72, the position that corresponding to the four rounded-shaped channels 711 are provided with the four protrusion portions 711, for tightening the four steel balls 73, the bottom of the compression spring 75 in contact with the top of the protrusion portion 721, when applying the external force, the lock body 71 and the lock member 72 may move relatively to each other in the direction in which the compression spring 75 is compressed, the protrusion portion 721 of the lock member 72 and the steel ball 73 are dislocated, and the position of the steel ball 73 where between the lock body 71 and the lock member 72 leaves a certain gap, the steel balls 73 may be moved radically in the rounded-shaped channels 711 of the impeller latch 70.

Figure 13:
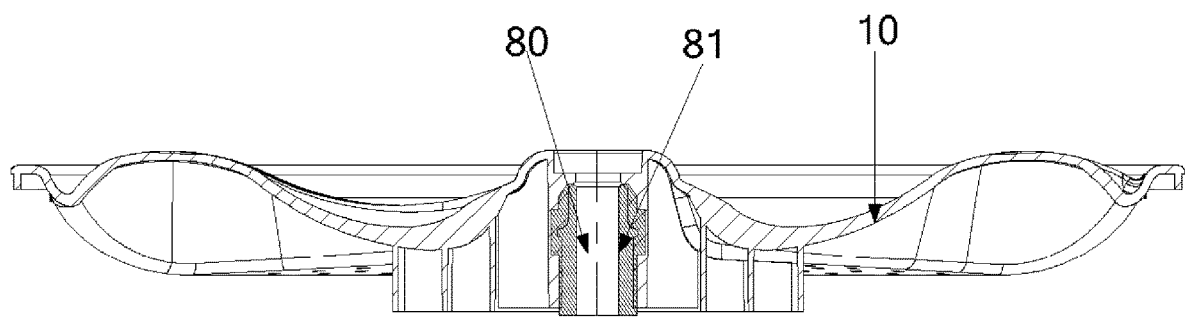
FIG. 13 is a cross-sectional view of the impeller in FIG. 11 according to an embodiment of the present disclosure.
Figure 14:
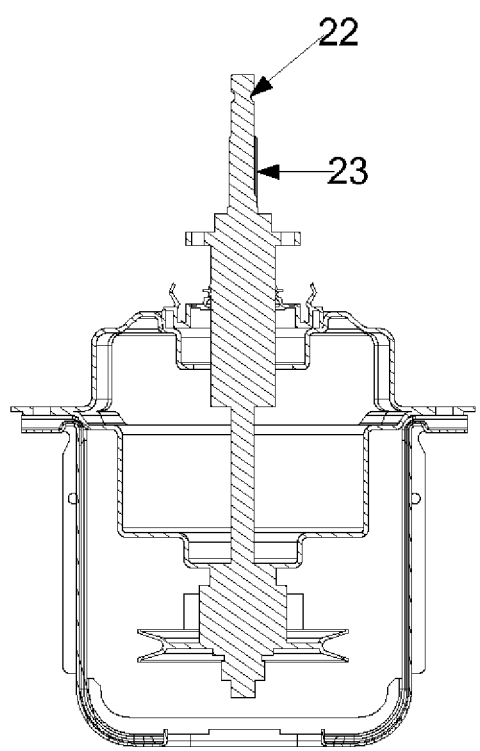
FIG. 14 is a cross-sectional view of the decelerating clutch in FIG. 11 according to an embodiment of the present disclosure.

Further, referring to FIG. 13, the rotary shaft 20 is provided with a first spline 23 in the axial direction of the upper portion, and the inner wall of the mounting through hole 80 is provided with a second spline 81 that fitted with the first spline 23, the impeller 10 is installed on the rotary shaft 20 by the cooperation of the first spline 23 and the second spline 81.

Specifically, when installing the impeller latch 70, use one hand to press the lock body 71 and the other hand to lift up the lock member 72 upwardly, and the lock member 72 is moved upwardly with respect to the lock body 71, the inside protrusion portion 721 of the lock member is dislocated with the steel ball 73, and a certain space is provided between the lock body 71 and the lock member 72 at the position of the steel ball 73, and the steel ball 73 is moving in the direction that far away with the lock body 11, sleeves the impeller latch 70 on the top end of the rotary shaft 20, so that the snap portion 73 is stretched out and clamped the second groove 22, when the steel ball 73 of the impeller latch 70 is aligned to the second groove 22 of the rotary shaft 20 of the decelerating clutch, the portion of the steel ball 73 that exposed in the rounded-shaped channel 711 is clamped in the second groove 22, and at this time, when remove the external force, the steel ball 73 of the impeller latch 70 fit with the second groove 22 of the rotary shaft 20 of the decelerating clutch, and locked by the protrusion portion 721 on the inner side of the lock member 72, to achieve the fitted connection of the impeller latch 70 and the rotary shaft 20 of the decelerating clutch.

When disassembly the impeller 10, lift up the lock member 72 upward by hand, so the lock member 72 is moved upward with respect to the lock body 71, and the inner protrusion portion 721 of the lock member 72 is dislocated with the steel ball 73, the steel ball 73 is squeezed into the gap between the lock member 72 and the lock body 71 by the rotary shaft 20 of the decelerating clutch, the entire impeller latch 70 is disengaged from the top of the rotary shaft 20 of the decelerating clutch, therefore the impeller 10 may be easily disassembled from the rotary shaft 20 of the decelerating clutch without any additional accessory, making the disassembly and installation of the impeller 10 become quick and easy, and less damage to the parts during the disassembly, facilitating the cleaning of parts such as impeller.

The present disclosure provides a washing machine, in which the impeller 10 is engaged to the rotary shaft 20 of the decelerating clutch by the spline, and then fastened the impeller 10 to the rotary shaft 20 of the decelerating clutch by the coupling of an impeller latch 70 and the rotary shaft 20, making the disassembly and installation of the impeller 10 become quick and easy, mitigates damage to the parts during the disassembly, facilitating the cleaning of impeller, and prolonging the service life of the whole machine.

It should be noted in the present embodiment, the impeller latch 70 and the impeller 10 are separate means, and in other embodiments, the impeller latch 70 may be fixedly provided on the impeller 10, the lock member 72 is clamped and fixedly connected with the impeller 10, by the application of the external force to the lock member 72, the impeller 10 may be ejected from the decelerating clutch to facilitate the installation and disassembly of the impeller 10.

It is to be understood that the material of the impeller may be chose according to practical needs. In the present embodiment, it is preferable that the impeller 10 consists of a stainless steel material. Due to the use of metal structure to make impeller, the structure includes a very strong hardness, the bottom not need of number of ribs used to reinforce strength, which is usual in plastic wheel, and thus the cooperation of the impeller connection assembly and the impeller makes the cleaning more convenient and simple, and the shape more beautiful.

The forgoing description is merely preferred embodiments of the present disclosure and does not limit the patent scope of the present disclosure, any equivalent structure or equivalent process modification used according to the contents of the specification and accompanying drawings in the present disclosure, no matter whether it is directly or indirectly used in any other related technical field, should be included within the protection scope of the present disclosure.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A washing machine comprising an impeller, a decelerating clutch and an impeller connection assembly, the decelerating clutch comprises a rotary shaft; the impeller connection assembly is clamped and connected to the rotary shaft, so that the impeller is clamped and fixedly connected to the rotary shaft in a detachable way, wherein the impeller connection assembly comprises a latch piece, the latch piece comprises a latch core and a receiving chamber, one end of the rotary shaft is located within the receiving chamber passing through the impeller, and is clamped and fixed with the latch core.

2. The washing machine according to claim 1, wherein the impeller connection assembly comprises a spline, wherein the impeller coupled with the rotary shaft by the spline, the latch piece is clamped and fixedly engaged with the rotary shaft and engaged with the impeller, to limit the movement of the impeller in an axial direction of the rotary shaft.

3. The washing machine according to claim 2, wherein the impeller connection assembly also comprises a protective cover and a cover pressed spring, the protective cover is provided with a receiving hole for receiving the latch piece; a bottom surface of the protective cover is provided with several snaps, the snaps are clamped with an engaging hole preset on the impeller; one end of the cover pressed spring is in contact with a bottom surface of the protective cover, the other end of the cover pressed spring is in contact with the impeller.

4. The washing machine according to claim 3, wherein the impeller is provided with a first groove for receiving the cover pressed spring, one end of the cover pressed spring being in contact with the impeller is located in the first groove.

5. The washing machine according to claim 4, wherein the bottom surface of the protective cover is further provided with a reinforcing rib, which is fitted with a guide hole preset in the impeller to guide the protective cover to move in the axial direction of the receiving hole.

6. The washing machine according to claim 1, wherein the latch piece comprises a latch case, a latch body, a latch pressed spring and a clamp retainer ring; the latch case is provided with a through hole for accommodating the latch body, a protrusion portion of a bottom end of the through hole is provided with a restraining step; the latch body is movable in an axial direction of the through hole, a bottom end of the latch body is recessed inwardly to form a receiving chamber for accommodating the rotary shaft; a top end of the latch pressed spring is in contact with the latch body and a bottom end of the latch pressed spring is in contact with the restraining step; the clamp retainer ring is detachably fixed to an outer wall of the latch body, and is located below the restraining step to connect to the restraining step; the outer wall of the latch body is provided with a restraining hole that may go through the receiving chamber in a corresponding position of restraining step; on an inside of the restraining hole is provided with a restraining protrusion, and the restraining protrusion is clamped and engaged with a restraining groove preset on the rotary shaft.

7. The washing machine according to claim 6, wherein the outer wall of the latch body is provided with a latching groove fitted with the clamp retainer ring; the clamp retainer ring is located within the latching groove, clamped and connected to latch body.

8. The washing machine according to claim 6, wherein the restraining hole is a tapered hole, and an inner diameter of the end of the tapered hole that communicates with the receiving chamber is smaller than an inner diameter of the other end; the restraining protrusion is a sphere.

9. The washing machine according to claim 1, wherein the impeller connection assembly comprises a spline, wherein the impeller is coupled with the rotary shaft by the spline, the latch piece is clamped and fixedly engaged within the rotary shaft, and clamped and fixedly connected with the impeller to limit axial movement of the impeller in the rotary shaft.

10. The washing machine according to claim 9, wherein the latch piece comprises a latch case, a latch body, a latch pressed spring and a clamp retainer ring; the latch case is provided with a through hole for accommodating the latch body, a protrusion portion of a bottom end of the through hole is provided with a restraining step; the latch body is movable in an axial direction of the through hole, a bottom end of the latch body is recessed inwardly to form a receiving chamber for accommodating the rotary shaft; a top end of the latch pressed spring is in contact with the latch body and a bottom end of the latch pressed spring is in contact with the restraining step; the clamp retainer ring is detachably fixed to an outer wall of the latch body, and is located below the restraining step to connect to the restraining step; the outer wall of the latch body is provided with a restraining hole that may go through the receiving chamber in a corresponding position of restraining step; on an inside of the restraining hole is provided with a restraining protrusion, and the restraining protrusion is clamped and engaged with a restraining groove preset on the rotary shaft.

11. The washing machine according to claim 10, wherein the outer wall of the latch body is provided with a latching groove fitted with the clamp retainer ring; the clamp retainer ring is located within the latching groove, clamped and connected to latch body.

12. The washing machine according to claim 10, wherein the restraining hole is a tapered hole, and an inner diameter of the end of the tapered hole that communicates with the receiving chamber is smaller than an inner diameter of the other end; the restraining protrusion is a sphere.

13. The washing machine according to claim 9, wherein the latch core comprises a handle portion and two clamping arms that extending from a same side of the handle portion; the rotary shaft is provided with a third groove in ring shape; the two clamping arms located in the third groove are configured to clamp and fix to the rotary shaft.

14. The washing machine according to claim 13, wherein the latch piece comprises an impeller latch case and an impeller latch cover; wherein the impeller latch case is clamped and fixedly connected to the impeller, the impeller latch cover is clamped and fixedly connected to the impeller latch case, and the latch core is clamped and connected to the impeller latch cover.

15. The washing machine according to claim 14, wherein the latch core comprises two elastic snaps that extending from the same side of the handle portion, the two elastic snaps are located outside the two clamping arms; the impeller latch cover sets an insertion hole and two fixing holes, the insertion hole is configured for the latch core to insert into the receiving chamber and the fixing holes, which are located on both sides of the insertion hole and are fitted with two elastic snaps.

16. The washing machine according to claim 1, wherein the impeller is made up from material of stainless steel.

* * * * *